United States Patent [19]
Bate et al.

[11] 3,808,435
[45] Apr. 30, 1974

[54] INFRA-RED QUANTUM DIFFERENTIAL DETECTOR SYSTEM

[75] Inventors: Robert T. Bate, Richardson; Michael A. Kinch, Dallas; Dennis D. Buss, Richardson, all of Tex.

[73] Assignee: Texas Instruments Incorporated, Dallas, Tex.

[22] Filed: May 29, 1973

[21] Appl. No.: 365,294

[52] U.S. Cl. .................. 250/332, 250/349, 307/311, 328/2
[51] Int. Cl. .................. G01t 1/24
[58] Field of Search .......... 250/332, 338, 340, 349; 307/308, 311; 328/1, 2

[56] References Cited

UNITED STATES PATENTS 3,660,663 5/1972 Guildford et al. .................. 250/332
3,723,642 3/1973 Laakmann .................. 250/332

*Primary Examiner*—Archie R. Borchelt
*Assistant Examiner*—Davis L. Willis
*Attorney, Agent, or Firm*—Harold Levine; William Hiller; James Comfort

[57] ABSTRACT

An improved infra-red scanning system is disclosed. The scanning system includes an infra-red detector array for providing electrical signals responsive to IR radiation. The electrical signals are processed by a semiconductor charge transfer device multiplexer from which display compatible signals are produced. The electrical signals are a.c. coupled to the semiconductor charge transfer device, thereby substantially eliminating the large IR background noise. In a preferred embodiment a photocapacitor advantageously both detects the IR radiation and a.c. couples the signal to a charge coupled device array.

11 Claims, 10 Drawing Figures

INFRA-RED QUANTUM DIFFERENTIAL DETECTOR SYSTEM

The present invention pertains generally to infra-red (IR) detection and display systems and more particularly to an IR system wherein semiconductor charge transfer device arrays are used to multiplex electrical signals produced by an IR detector array and wherein the electrical signals are a.c. coupled to the multiplexer array.

Image systems for visual radiation have progressed at a rapid rate in recent years and compact, reliable image systems of a variety of configurations are available in the art. With respect to IR radiation detection systems, however, a number of problems are encountered which have to date required rather expensive, bulky IR detection systems. By way of illustration, one conventional IR detector system has an array of IR detectors, each detector having an amplifier for amplifying its output. The amplified output is connected to a multiplexer scan converter, which includes an array of light emitting diodes (LED) corresponding to the detector array. Scanning optics are used for scanning the target and also the LED array. A photosensitive pick-up tube is focused on the LED array and provides signals to a visual display, such as a CRT. It can be seen that such a system requires a large number of amplifiers (one per channel) and scanning optics. Provision of an IR detector system wherein these requirements could be eliminated would provide a much simpler, less expensive, and more reliable IR system.

One promising technique for providing an improved IR system includes utilizing a semiconductor charge transfer device (CTD) array such as a charge-coupled device (CCD) array or a bucket-brigade (BB) array. Such CTD arrays have been used for visual imagers (i.e., radiation on the order of 5,000A). Two major problems are encountered in this technique, however, the first being fabrication of a CTD on IR sensitive material. A second even more perplexing problem is the fact that the thermal background radiation at room temperature is many orders of magnitude greater in the IR than in the visible (41 orders of magnitude greater at 10 $\mu$m than at 5,000A). This thermal background imposes severe restrictions when it is recognized that in order to achieve 0.1° K resolution a typical IR imager would receive $10^3$ "background" photons from the room temperature background for every "signal" photon it receives. As a result, the homogeneity of materials is extremely demanding, a 0.1 percent variation in collection efficiency from one imager location to another producing a noise charge equal to the signal charge. A second limitation is the requirement for very large storage capacitance. The integration time has a lower limit set by the maximum clock rate, and the amount of charge generated by the background in this integration time is large. Thirdly, the CCD itself must have an extremely large dynamic range such that when the background charge is subtracted from the total, the remaining charge is a true representation of the signal.

Accordingly, an object of the present invention is the provision of an improved IR detector system.

A further object of the invention is the provision of an IR detector system which includes a CTD array for multiplexing the electrical output signals produced by an IR detector array.

Another object of the present invention is the provision of an IR detector system wherein the output signals of an IR detector array are a.c. coupled to a CTD multiplexer array for producing display compatible signals substantially free from IR background noise.

Still another object of the invention is an IR detector system having an IR detector array of photocapacitors for detecting IR radiation and a.c. coupling the resultant electrical signals to a CTD multiplexer array.

The various objects of the present invention are provided in accordance with the present invention wherein a CTD array is utilized to process the output signals of an IR detector array and, by controlling the clock rate of the CTD array, provide a direct display-compatible output without the requirement for scanning optics. As a result of the sensitivity of the CTD array, the IR detectors can be coupled directly to the CTD without first being amplified, a single large bandwidth amplifier at the CTD output being sufficient. Thus, the requirement of one amplifier per channel of conventional IR detector arrays can be advantageously eliminated.

More specifically in accordance with the invention, the IR detector array is a.c. coupled to the CTD array. This substantially eliminates IR background radiation, materially reducing homogeneity, linearity range and storage capacitance limitations which would otherwise be experienced.

In a preferred embodiment of the invention the IR detector array includes photocapacitors which not only detect IR radiation but also provide means for a.c. coupling the detected signal to the CTD array. Various circuit configurations are provided for effecting the a.c. coupling at the proper time and sequence.

Other objects, advantages, and features of the invention will be apparent upon reading the following detailed description of illustrative embodiments in conjunction with the drawings wherein.

Figure 4A:
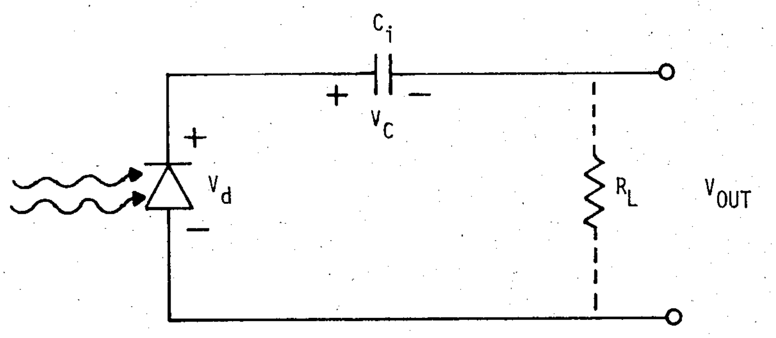
Figure 4B:
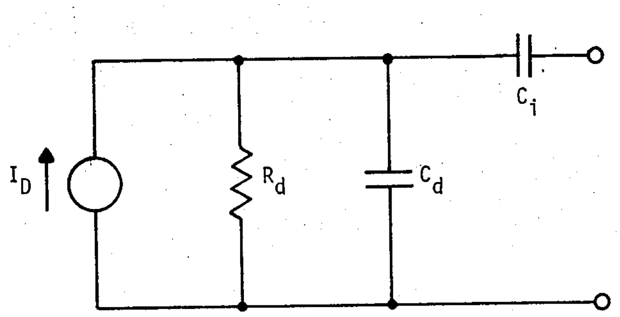
Figure 5:
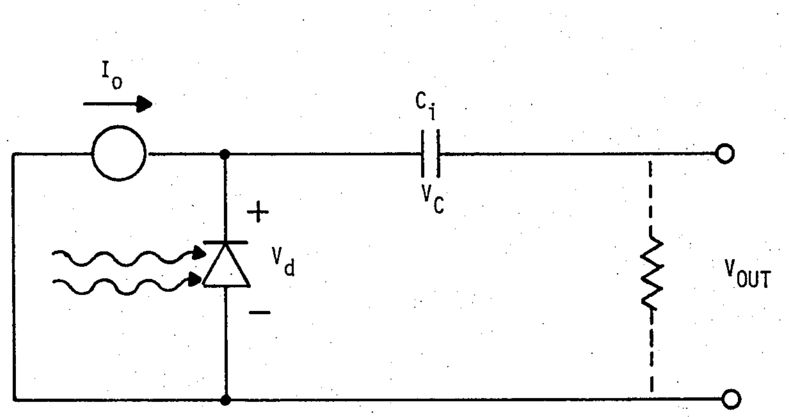
Figure 6:
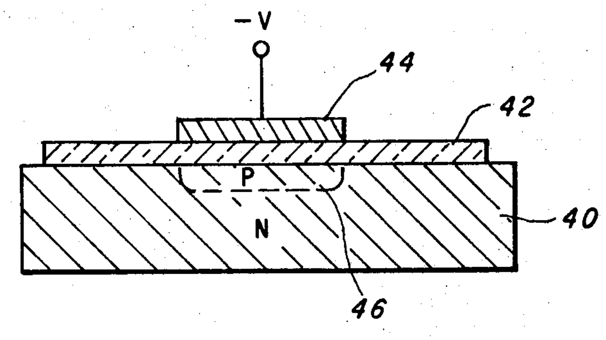
Figures 7, 8, 9:
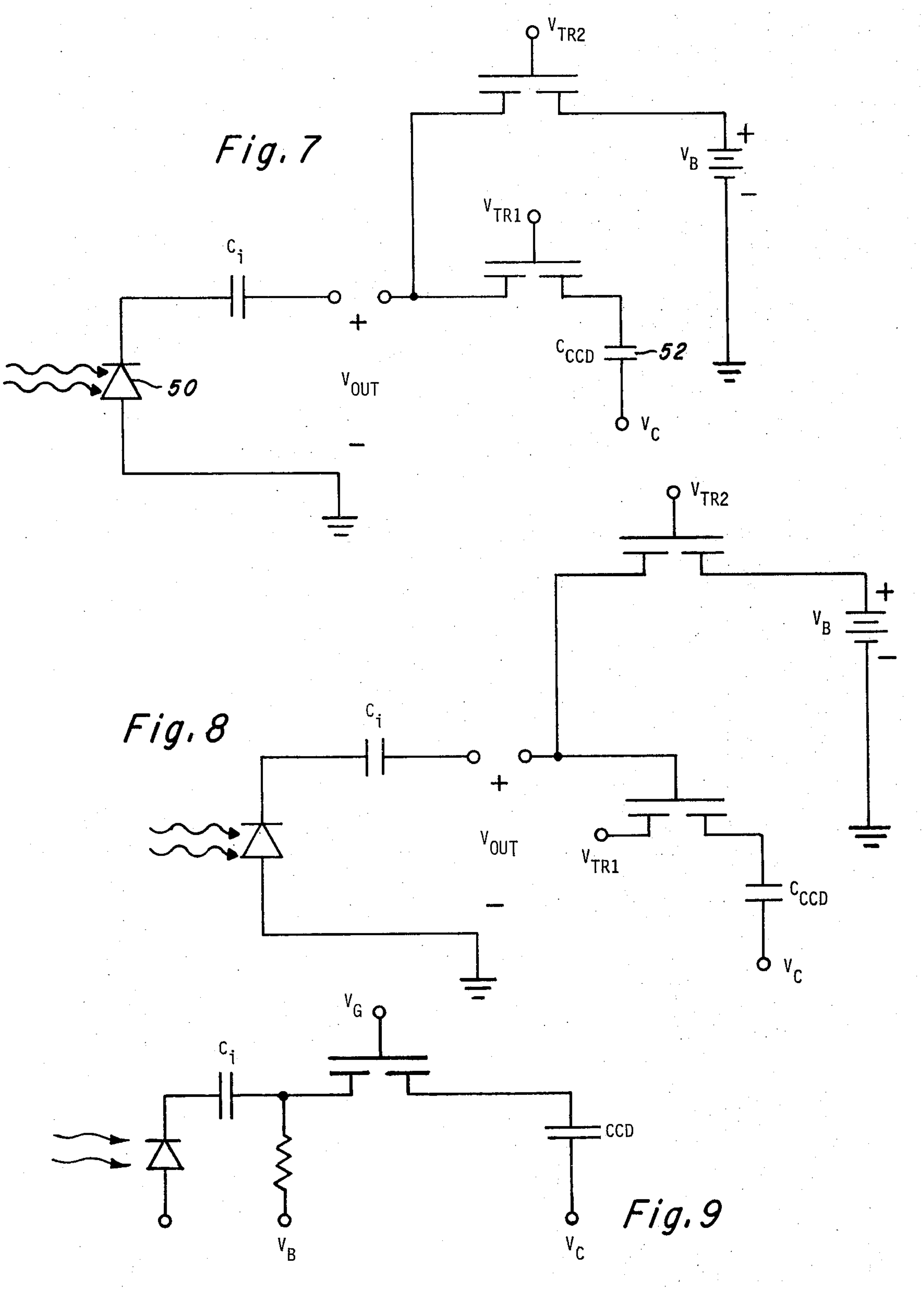

FIGS. 4*a* and 4*b* schematically illustrate an IR photocapacitor for use in the IR detector system of the present invention;

FIG. 5 schematically depicts a quantum differential detector operated in the zero bias mode;

FIG. 6 is a cross-sectional view of a MIS photo capacitor in accordance with the invention; and FIGS. 7–9 schematically depict circuit configurations for interfacing the quantum differential detector of the present invention with a CTD array.

Figure 1:
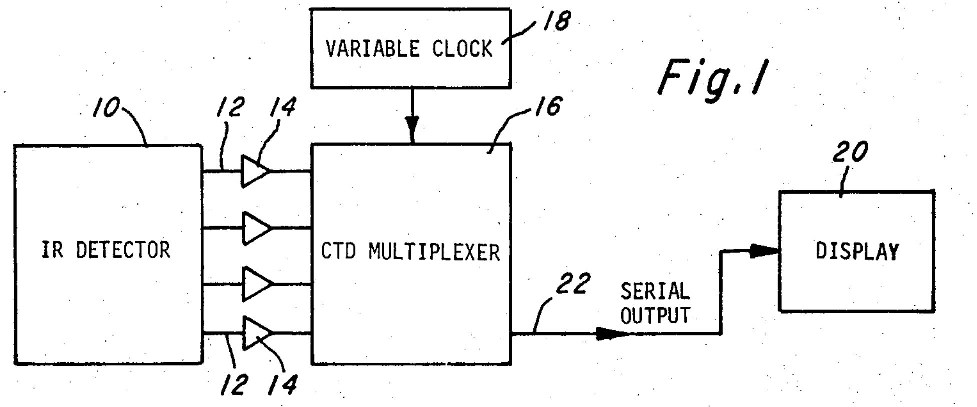
FIG. 1 is a block diagram illustrating utilization, in accordance with the invention, of a CTD multiplexer for receiving electrical signals from an IR detector and providing a display compatible output.

With reference briefly to FIG. 1, an IR detector system is disclosed in block diagram. A conventional IR detector array 10 provides electrical signals corresponding to IR radiation of a scanned target at each output channel 12.

Any conventional IR detector array can be used. The electrical signal at the output of each channel 12 is amplified by a conventional amplifier 14. The output of amplifiers 14 are applied as parallel inputs to a CTD array 16. Suitable CCD arrays and BB arrays are discussed in the literature and will not be described in more detail here. The parallel data from the amplifiers 14 is clocked into the CTD 16 at a rate controlled by the variable clock system 18. Again, suitable clock systems are available in the art. The clock system 18 is effective to provide a serial read-out of the data stored by the CTD at a selectable rate corresponding to the display 20. The serial output from the CTD is taken at terminal 22 and connected to the display 20. Provision of the CTD 16 and associated clock system 18 for multiplexing the IR detector output eliminates the requirement of scanning optics for multiplexing the IR detector array output to provide a display compatible signal.

Figure 2:
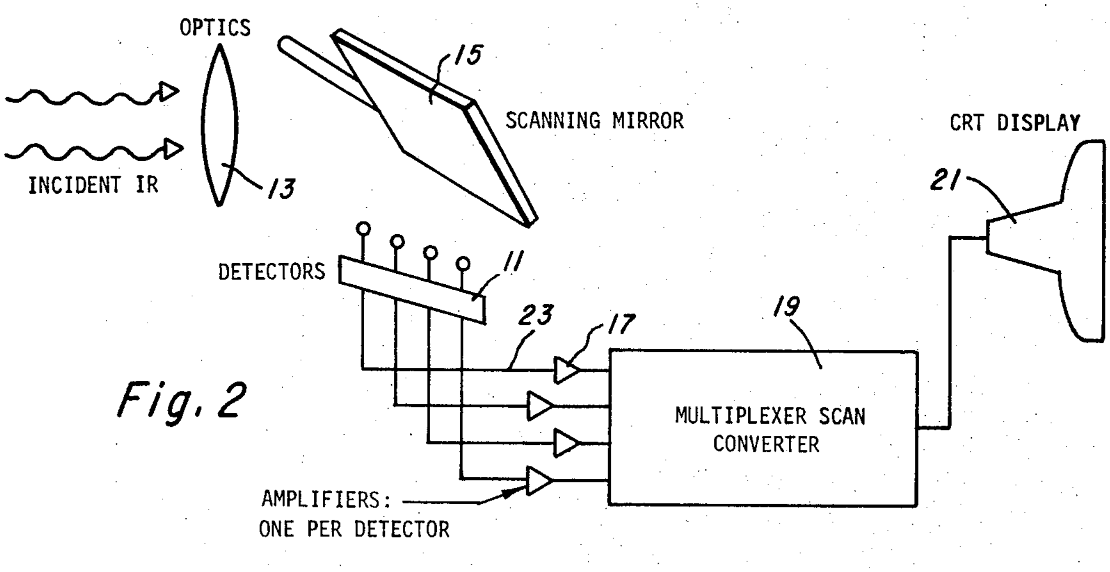
FIG. 2 is a pictorial illustration of a conventional IR detector system.

The IR imager system shown in FIG. 1 is to be contrasted to the conventional IR system shown pictorially in FIG. 2. In FIG. 2, incident IR radiation is focused on an array 11 of IR detectors by scanning optics 13 and a scanning mirror 15. An amplifier 17 is connected to each detector of the array 11, and the amplified signal is inputted to a scan converter 19. Typically, the scan converter 19 requires scanning optics synchronized with the target scanning optics, and a multiplexer for providing signals to the CRT diaplay 21 in a compatible format. The conventional scan converter and multiplexer 19 is replaced, in the embodiment of FIG. 1, by a CTD array 16.

Figure 3:
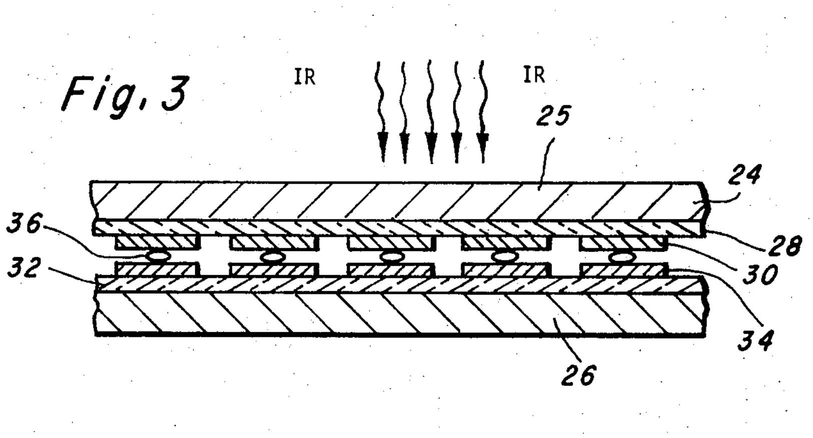
FIG. 3 is a cross-sectional view of an IR detector configuration in accordance with the invention wherein the IR detectors are directly coupled to a CTD array.

With reference to FIG. 3 there is illustrated an IR detector system in accordance with the invention wherein multiplexing is accomplished at the detector, thereby eliminating the multiple amplifiers 17 and multiple leads 23 (FIG. 2) from the cryostat associated with conventional IR detector systems. In FIG. 3 a hybrid system includes an IR detector chip 24 sandwiched with a CCD multiplexing chip 26. In the illustrated embodiment, the IR chip 24 is a metal-insulator-semiconductor (MIS) configuration. By way of illustration, the semiconductor 24 may comprise a mercury-cadmium-telluride (HgCdTe) composition. The thickness of the layer 24 is less than the diffusion length of charge carriers generated by the IR radiation which strikes surface 25. A relatively thin insulating layer 28, on the order of 600A in thickness, is formed over a surface of the semiconductor 24. An array of conductive electrodes 30 completes the detector structure.

The CCD multiplexer array includes a silicon substrate 26 having one surface covered by a silicon dioxide insulating layer 32. An array of electrodes 34 is defined over insulating layer 32 to complete the CCD structure. The array of electrodes 34 is defined to correspond to the detector array 30. The conductive electrodes 30 and 34 are electrically connected as illustratively shown by ball bonds 36. Suitable bias means (not shown) are connected to the MIS and CCD structures for operation.

The specific materials described are by way of illustration and not limitation and it will be apparent that other suitable IR and semiconductor materials can be utilized.

As discussed previously, the background radiation flux at room temperature presents major difficulties for IR detector systems. In accordance with the present invention the background radiation is eliminated from an IR detector output by utilization of a quantum differential detector (QDD). The QDD is essentially a quantum analog of the pyroelectric detector, and similarly requires a chopper. The signal from the QDD is proportional to the difference in photon flux between the chopper blade, which is held at background temperature, and the scene. By removing the background, the requirements on detector uniformity and dynamic range of the associated electronics are greatly reduced.

With reference to FIG. 4*a* there is schematically illustrated a QDD in accordance with the invention, having an equivalent circuit as shown in FIG. 4*b*. Structurally, the QDD is basically a capacitively coupled photodiode. The photovoltage due to the background (assumed to be at $T_B \sim 300°$ K) is dropped across the capacitor $C_i$ which charges through the resistor $R_L$. However, when the radiation is chopped between $T_B$ and $T_B + \Delta T$ at a frequency $\omega_m$ an a.c. signal proportional to $\Delta T$ appears at the output terminals $V_{OUT}$. For an incident signal photon flux density $\phi_s$ the illustrated current generator ($I_D$, FIG. 4*b*) is given by $\eta q \phi_s A_d$, where $\eta$ is the detector quantum efficiency, $q$ the unit of charge, and $A_d$ the detector area. It can be shown that for normal operating parameters, the change in voltage across the output terminals is directly proportional to the photon flux density and $\Delta T$.

Since the output signal which will be applied to the CCD multiplexer is proportional to $\Delta T$ the dynamic range requirements on the CCD are greatly reduced. In addition the homogeneity requirements on the detector material are substantially reduced for two reasons. First variation in quantum efficiency from detector to detector result in variations in background photovoltage which may be huge compared with the minumum detectable signal. However, since the background photovoltage is dropped entirely across the capacitor $C_i$, these variations never affect the output a.c. signal. This is a major advantage of the QDD. Secondly, a further insensitivity to material homogeneity is obtained when the QDD is operated in the open-circuit mode, as shown in FIG. 4. The responsivity (i.e., output voltage per watt of incident IR radiation) is independent of quantum efficiency if the background current is much greater than any thermal currents flowing in the QDD. By way of example, the value of the output voltage $\Delta V_s$ corresponding to $\Delta T = 0.1°$ K, for a detector at 77° K looking at a 300° K background, for a detector having a 5$\mu$m cutoff, (ignoring atmospheric absorption and assuming ideal cold shielding) is $\Delta V = 24\ \mu$ volt. For a detector have a 12 $\mu$m cutoff, $V_s = 12\ \mu$ volt.

The relatively low responsivity of the open circuit mode QDD (FIG. 4) is not a severe problem when the IR detector is coupled to a CDD multiplexer. Even though the output voltage is only on the order of 10s of $\mu$V's for $T = 0.1°$ K, this voltage is amplified by the ratio $C_i/C_{CCD}$ when the signal is transferred to the CCD. Typical values at this capacitance ratio are 10–100 which gives minimum signal voltage in the CCD of 0.1–1.0 mV, well above CCD noise levels.

Higher responsivity can be obtained, if required, by operating the QDD in the zero bias mode, which is shown schematically in FIG. 5. In this case, however, the output voltage is proportional to the quantum efficiency $\eta$ and the imager is subject to the same material uniformity requirements as a low background detector. Again in the zero bias mode the QDD does not sense the background photovoltage because of the coupling capacitor $C_i$. In the zero bias mode a d.c. current source is used to bias the diode near zero voltage.

Two types of QDD's are particularly advantageous for use in the IR imager system of the present invention, a Metal-Insulator-Semiconductor (MIS) photocapacitor and a lead-salt photodiode. The MIS photocapacitor, when biased into inversion, is a photodiode in series with the insulator capacitance. A suitable MIS photocapacitor is shown in cross-section in FIG. 6. By way of illustration, the substrate 40 comprises a suitable IR detector material, such as n-type Hg Cd Te. A thin (on the order of 600A) insulating layer 42 is formed over the surface of the substrate 40. A conductor 44 is in turn formed over the insulator, defining a MIS capacitor structure. When the conductor 44 is suitably biased with a negative voltage (for an n-type substrate), an inversion region enclosed by dashed line 46 is formed. Thus, there is a diode in series with the electrode 44 to substrate capacitance (as shown schematically in FIG. 4*a*). A particularly advantageous feature of this structure (FIG. 6) is that one unitary structure provides both the diode and capacitance. It is appreciated that, if desired (as for the zero bias mode of operation shown in FIG. 5) bias means could be connected to the inversion region 46 by conventional techniques.

The lead salt photodiode also possesses advantageous characteristics for use in the QDD of the present invention, particularly a large p-n junction capacitance. A variety of lead salts can be utilized; exemplary compositions are PbGeTe through PbTe to PbSnTe.

There are numerous ways in which the signal can be transferred from the QDD to the CTD and three suitable configurations are illustrated in FIGS. 7–9. In FIG. 7, when the scene is before the detector 50, the transfer gate $V_{TRI}$ is turned on and $V_{out}$ is constrained to be $V_T$ (=threshold voltage) below $V_{TRI}$. If the voltage levels are chosen so that, when $\Delta T=0$, the CCD capacitance 52 is filled to one-half its capacity, then the signal charge in $C_{CCD}$ will be proportional to $\Delta T$. The cycle is completed by the following events. $V_{TRI}$ is turned off and the charges in the CCD are "clocked out." During this time the chopper removes the scene and $V_{TR2}$ turns on returning $V_{out}$ to a known voltage $V_B$. Now the device is pre-set and ready to receive another signal. The chopper can be eliminated when the device is operated as a line scanner. In this mode the signal is proportional to changes in intensity as the scene sweeps across the detector. This mode, though potentially very useful, cannot readily be extended to a two-dimensional imager.

A second implementation of CCD multiplexing is shown in FIG. 8. In this example the output voltage $V_{out}$ is applied to the gate of the switching transistor TR1 and the $C_{CCD}$ 52 is charged to a voltage proportional to $V_{out}$. The transistor is then turned off by $V_{TR1}$ and the information in the CCD is clocked out.

With reference to FIG. 9, the circuit operates like that of FIG. 7 except that resistor 54 is used to eliminate the electrical signals at frequency less than $1/C_tR$. If $C_tR$ is on the order of the frame time or longer, fixed pattern variations in detector response will be eliminated. In this configuration, the resistor R serves the same function as the reset transistor $V_{TR2}$ of FIG. 7.

It can be seen that the various objects of the present invention have advantageously been achieved by the provision of an IR imager system wherein the IR detector array is a.c. coupled to a CTD multiplexer array. While various specific embodiments have been described in detail, it will be apparent to those skilled in the art that various changes may be made without departing from the spirit or scope of the invention.

What is claimed is:

1. An infra-red imager system comprising in combination:

a. infra-red detector means for producing electrical signals corresponding to incident radiation at a plurality of parallel output channels;

b. an array of semiconductor charge transfer devices coupled to said detector means for receiving said electrical signals in parallel at a first clock rate;

c. means for providing a serial read-out of data from said array of charge transfer devices at a second clock rate; and d. display means coupled to said array of charge transfer devices for receiving said serial data at said second clock rate.

2. An infra-red imager system as set forth in claim 1 wherein each channel of said detector means is coupled to said array of charge transfer devices through amplifying means.

3. An infra-red imager system comprising in a unitary structure a. infra-red detector means comprising a planar array of infra-red sensitive elements on a first substrate.

b. a planar array of semiconductor charge transfer devices on a second substrate, each device having a control electrode for receiving a signal;

c. means for connecting each detector element directly to a corresponding control electrode of a charge transfer device thereby providing a unitary detector and multiplexer structure whereby amplifiers are not required for connecting a detector channel to the multiplexer; and d. clocking means connected to said array of charge transfer devices for providing a serial read-out of data therefrom at a display compatible clock rate.

4. An infra-red imager system comprising in combination:

a. an array of infra-red detectors;

b. a semiconductor charge transfer device multiplexer for receiving parallel data from said detector array and providing serial output data at a preselected frequency; and c. means for a.c. coupling said detector array to said charge transfer device multiplexer.

5. An infra-red imager system as set forth in claim 4 wherein each detector comprises an infra-red wavelength photo-sensitive diode in series with a capacitance.

6. An infra-red imager system as set forth in claim 5 wherein each detector is further characterized by:

a. a semiconductor substrate of one conductivity type;

b. a relatively thin insulative layer over one surface of said substrate; and c. a conductive electrode over said insulative layer for defining a conductor-insulator-semiconductor capacitance, said electrode disposed for receiving a bias voltage sufficient to invert the conductivity type of the surface of said substrate adjacent said insulative layer, thereby forming a diode in series with said capacitance.

7. An infra-red imager system as set forth in claim 6 further including means for ohmically contacting said inversion layer for selectively applying a bias voltage thereto.

8. An infra-red imager system as set forth in claim 6 wherein said a.c. coupling means include insulated-gate field-effect transistor switching means selectively connecting said conductive electrode to said multiplexer.

9. An infra-red imager system as set forth in claim 5 wherein each detector comprises a mercury-cadmium-telluride photosensitive capacitor.

10. An infra-red imager system as set forth in claim 5 wherein each detector comprises a lead-salt photosensitive capacitor.

11. In an infra-red imager system the combination comprising:

a. an array of infra-red wavelength sensitive detectors respectively comprising a semiconductor substrate of one conductivity type having a thin insulative layer over one surface thereof, an array of metal field plates formed on said insulative layer and respectively biased to form inversion layers of opposite conductivity type in said substrate adjacent said insulative layer, thereby defining a photosensitive diode in series with the field plate to semiconductor capacitance, infra-red radiation impinging upon said diode producing a change in voltage across said capacitance;

b. an array of semiconductor charge transfer devices, each having a control electrode for receiving a voltage signal, said array having a first portion corresponding to said array of detectors, and disposed for selectively receiving in parallel and storing voltage signals produced across said capacitance of each detector; and a second portion for providing a serial read-out of said stored voltage signals at a preselected clock rate; and c. means for a.c. coupling the signal produced by each detector to said array of charge transfer devices, said means including an insulated-gate field-effect transistor coupling each of said field plates to a corresponding control electrode of a charge transfer device in said first portion of said charge transfer device array.

* * * * *